United States Patent
Van Den Enden

[19]

[11] Patent Number: 6,079,045
[45] Date of Patent: Jun. 20, 2000

[54] TRANSMISSION SYSTEM AND RECORDING SYSTEM HAVING A SIMPLIFIED SYMBOL DETECTOR

[75] Inventor: Gijsbert J. Van Den Enden, Eindhoven, Netherlands

[73] Assignee: U.S. Philips Corporation, New York, N.Y.

[21] Appl. No.: 08/992,292

[22] Filed: Dec. 17, 1997

[30] Foreign Application Priority Data

Dec. 18, 1996 [EP] European Pat. Off. ............ 962003602

[51] Int. Cl.⁷ .......................... H03M 13/00; G11B 20/18
[52] U.S. Cl. ..................... 714/780; 714/765; 714/769; 714/805; 714/809; 714/814
[58] Field of Search ..................... 714/765, 769, 714/780, 805, 809, 811, 812, 814, 817, 818

[56] References Cited

U.S. PATENT DOCUMENTS

| | | | |
|---|---|---|---|
| 4,393,499 | 7/1983 | Evans | 371/5 |
| 4,554,665 | 11/1985 | Beesley | 371/55 |
| 4,968,985 | 11/1990 | Riggle et al. | 341/106 |
| 5,090,026 | 2/1992 | Stern et al. | 375/47 |
| 5,170,396 | 12/1992 | Rivers et al. | 371/6 |
| 5,172,395 | 12/1992 | Dapper et al. | 375/99 |
| 5,333,153 | 7/1994 | Brown et al. | 375/104 |
| 5,373,513 | 12/1994 | Howe et al. | 371/42 |
| 5,390,195 | 2/1995 | Brush | 371/37.1 |
| 5,446,918 | 8/1995 | Lamy | 455/5.1 |
| 5,461,629 | 10/1995 | Sutterlin et al. | 371/30 |
| 5,615,223 | 3/1997 | Carr | 371/65 |
| 5,623,507 | 4/1997 | Burns et al. | 371/40.3 |

FOREIGN PATENT DOCUMENTS

WO9613905  5/1996  WIPO .

OTHER PUBLICATIONS

PCT International Search Report PCT/IB97/01532, Jun. 1998.

*Primary Examiner*—Stephen M. Baker
*Attorney, Agent, or Firm*—Michael E Belk

[57] ABSTRACT

In a transmission system or recording system, a detector (16,30) using quality measures indicating the quality of the received signal is applied.

In contradistinction with the prior art system the quality measure comprises the deviation of the position of transitions in the input signal from the nominal positions of said transitions. The advantage of using this type of quality measure is that the required information for determining it, is already available within the PLL (34) needed for clock recovery.

26 Claims, 6 Drawing Sheets

TRANSMISSION SYSTEM AND RECORDING SYSTEM HAVING A SIMPLIFIED SYMBOL DETECTOR

BACKGROUND OF THE INVENTION

The invention is related to a transmission system comprising a transmitter for transmitting digital symbols via a transmission channel to a receiver, said receiver comprises a detector, said detector comprising quality measure determining means for determining a quality measure of the input signal, the detector being arranged for deriving a sequence of reconstructed symbols from the input signal and the quality measure.

The invention is also related to a receiver, a recording system, a detector and a detection method.

A transmission system according to the preamble is known from the published international patent application WO 96/13905.

Such transmission systems find its use, for example, for transmitting digital symbols through the public telephone network, for transmitting multiplex signals between telephone exchanges or for transmitting digital signals in mobile telephony systems. Said recording systems may be used for recording and reproducing digital symbols using magnetic tape or magnetic discs such as hard discs and floppy discs. Such recording systems may also be used with optical or opto-magnetic discs, such as CD, CD-ROM or DVD (Digital Video Disc).

For transmitting source symbols via a transmission channel, or recording source symbols on a recording medium, these source symbols are often converted into coded symbols. A possible object of coding is obtaining a signal representing a sequence of coded symbols which has a frequency spectrum which meets specific requirements. One of these requirements is, for example, the lack of a DC-component, because a number of frequently used transmitting channels or recording media are incapable of transmitting a DC component. Another reason for the use of coding is obtaining the possibility of correcting transmission errors.

In the known transmission system a detector is used which makes decisions about the symbol value symbol-by-symbol. In order to increase the reliability of the detector, this detector comprises error detection means which detects transmission errors. The detector also comprises error correction means for correcting the value of the least reliable symbol(s) on basis of a quality measure associated with the detected symbols. In the known transmission system this quality measure is derived from the analog signal value at the instant on which the decision about the symbol value is taken. The use of the analog signal value for determining the quality measure requires additional hardware for determining and storing said analog signal value.

The object of the present invention is to provide a transmission system according to the preamble which does not require the above mentioned additional hardware.

SUMMARY OF THE INVENTION

Therefor the transmission system according to the invention is characterized in that the quality determining means are arranged for determining the quality measure from the position of transitions in the signal received from the transmission channel.

The present invention is based on the recognition that interfering signals not only cause variations of the analog value of the signal at the decision instants, but that they also cause variations of the positions of the transitions in the signal. A measure for the position of the transitions can very easily be obtained from the phase detector in the clock recovery circuit that always has to be present in such a transmission system.

It is observed that it is not required that for each symbol in the input signal the quality measure is determined. The quality measure is determined if a transition is present. If a code is used having transitions for every symbol, for each symbol a quality signal is available, allowing the use of a Viterbi detector. Such a code is e.g. the Manchester code.

An embodiment of the invention is characterized in that the quality determining means are arranged for storing the most recent transition having a position later than the nominal position, and for storing the most recent transition having a position earlier than the nominal position.

By only storing the positions of the phase errors corresponding to the most recent transition the transmission system is substantially simplified without decreasing the error correction probability.

BRIEF DESCRIPTION OF THE DRAWINGS

The present invention will now be explained with reference to the drawing figures. Herein shows.

DETAILED DESCRIPTION OF THE DRAWINGS

Figure 1:
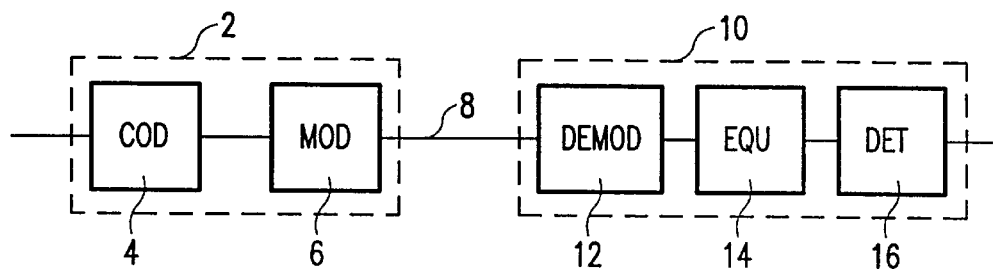
FIG. 1, a transmission system in which the invention can be used.

In the transmission system according to FIG. 1, a digital signal to be transmitted is applied to an encoder 4 in a transmitter 2. The output of the encoder 4 is connected to an input of a modulator 6. The output of the modulator 6 constitutes the output of the transmitter 2. The output of the transmitter 2 is connected via a transmission medium 8 to an input of a receiver 10. The received signal is applied to an input of a demodulator 12. The output of the demodulator is connected to an input of an equalizer 14. The output of the equalizer 14 is connected to an input of a detector 16. At the output of the detector 16, the detected symbols are available.

In the encoder 4, the digital symbols to be transmitted are encoded using an error correcting code. This can e.g. be a convolutional code or a block code such as a Reed-Solomon code. It is also conceivable that a so-called concatenated coding scheme is used.

The output symbols of the encoder 4 are modulated on a carrier by the modulator 6. Possible modulation methods are e.g. QPSK, QAM or OFDM.

The modulated signal is transmitted via the transmission medium 8 to the receiver 10. In the receiver 10, the received signal is demodulated by the demodulator 12. The demodulated signal is filtered by an equalizer to eliminate intersymbol interference caused by the limited bandwidth of the transmission medium. The detector 16 derives the output symbols from the equalized signal at the output of the equalizer 14. At the output of the detector 16 the output symbols of the receiver 10 are available.

Figure 2:
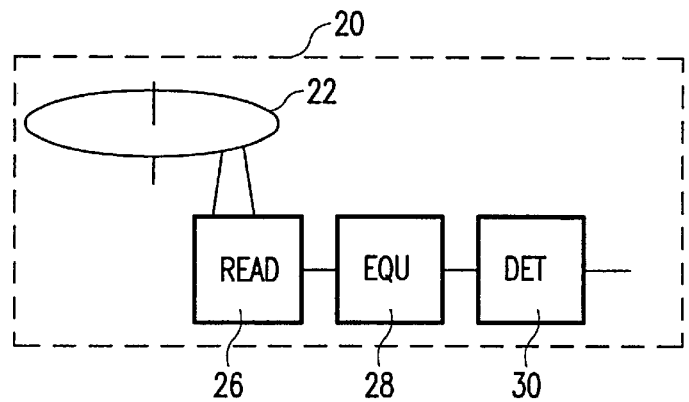
FIG. 2, a recording system in which the present invention can be used.

In the recording system 20 according to FIG. 2, an optical disc is read out by a read unit 26. It is assumed that the data written on the optical disc is coded according to the 8–14 EFM coding scheme as is used in the Compact disc standard. However the present invention is also applicable to the 8–16 EFM+ coding scheme as adopted in the DVD (Digital Video disc) standard. The EFM code has a minimum runlength (the distance between subsequent bits having a same value that are separated by a sequence of bits having the inverse value) of 3, and a maximum runlength of 11. The EFM+ code also has a minimum runlength of 3 and a maximum runlength of 11. This allows a system according to the invention to deal with EFM signals and EFM+ signals without having to reconfigure the detector. It is even not necessary to inform the detector about the type of code to be received. This is very advantageous in DVD players which have to be able to play discs according to the DVD standard using EFM+ as well discs according to the various CD standards using EFM. Without use of the present invention, separate detectors for EFM+ and EFM would be required.

The output of the read unit 26 is filtered by an equalizer 28 to eliminate undesired intersymbol interference. The output signal of the equalizer 28 is used by the detector 30 to obtain the sequence of detected symbols. The operation of the detector 30 will be discussed later in more detail.

Figure 3:
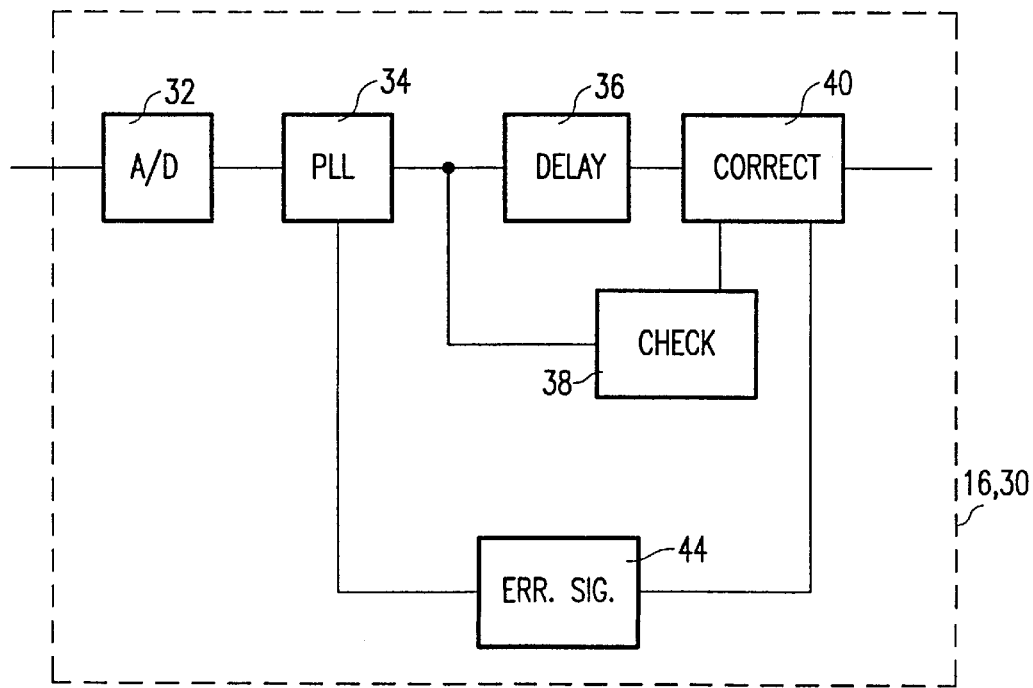
FIG. 3, a detector for use in the transmission system according to FIG. 1 or in the recording system according to FIG. 2.

In the detector 30 according to FIG. 3, the input signal is connected to an analog to digital converter 32. The output of the analog to digital converter 32 is coupled to an input of a digital phase locked loop 34. A first output of the digital phase locked loop, carrying the (yet uncorrected) reconstructed symbols, is connected to an input of a delay unit 36 and to an input of an error detector 38. A second output of the PLL 34, carrying a measure for the position of the zero crossings of the input signal of the phase locked loop 34, is connected to the means for determining a reliability measure, being here an error calculator 44.

An output of the error detector 38 is coupled to a first input of the error correction means 40. An output of the error calculator 44 is connected to a second input of the error correction means 40. An output of the delay unit 36 is connected to an third input of the error correction means 40. At the output of the error correction means 40 the (corrected) reconstructed symbols are available.

The analog to digital converter 32 in FIG. 3 samples the signal at the output of the equalizer 28 with a sampling period of 3T/2, in which T is the bit interval of the signal to be detected. It is observed that the sampling clock does not have to be synchronized to the bit clock but that it can be derived from a free running oscillator.

The phase locked loop 34 derives from the input signal a digital clock signal having a period equal to the bit interval. The phase locked loop also provides the (preliminary) reconstruction of the symbols present in the input signal. The reconstructed bits are presented in differential format, i.e. a "0" indicates a constant level of the signal at the input of the phase detector, and a "0" indicates a changing level of the signal at the input of the phase detector. At the second output of the phase detector, a signal representing the deviation of the position of an actual transition (zero crossing) of the input signal from the expected position of this transition. This deviation is used for determining the reliability measure according to the present invention.

According to the present invention it is sufficient to keep track of only two error signals and their positions. The error signals used represent the distance between a zero crossing and the nearest detection instant. There are two types of error signals calculated and stored.

The first error signal LeftError is calculated if a zero crossing having the nearest detection instant on its left side (detection instant is earlier than zero crossing) occurs. The value of the signal LeftError is equal to the distance between said zero crossing and said nearest detection instant. The second error signal RightError is calculated if a zero crossing having the nearest detection instant on its right side (detection instant is later than zero crossing) occurs. The value of the signal RightError is equal to the distance between said zero crossing and said nearest detection instant.

Also the relative position Dl and Dr with respect to the most recent update instant of these two error signals is stored. These error signals can in the case of errors be used to determine the most likely erroneous symbol. The error signals are calculated from the phase error provided by the phase locked loop 34.

The error detector 38 checks whether the runlength of the bits at the output of the phase locked loop is within the allowed range. If in the EFM (or EFM+) case, the run length is smaller than 3, an error is signaled. This occurs if in the sequence of bits at the output of the phase detector the string "11" or "101" is detected. An error is also detected if the runlength is equal to 11. This occurs if in the sequence of bits at the output of the phase detector the string "1000000000001" is detected. The error detector 38 signals to the error correction means 40 the type of error detected. From the type of error detected, and the error signals determined by the error calculator 44, the least reliable symbol or symbols can be determined and subsequently be corrected.

If the sequence of bits at the output of the phase detector 34 contains the string "11" (d=1 error) it is assumed that both bits are erroneous.

If the error signals indicate that there were two zero crossings in the neighborhood of the same detection instant, it is assumed that the zero crossings should not have occurred at all, and the string "11" is inverted to obtain the corrected bits. In such a situation, the values of Dl and Dr are equal to zero.

If the distance between the zero crossings is larger, it is assumed that one of the "1"s has to be shifted to the right, and that the other "1" has to be shifted to the left to obtain the string "1001" which meets the run length requirements. In this situation, at least one of the values of Dl and Dr is different from 0.

If the sequence of bits at the output of the phase detector 34 contains the string "101" (d=2 error) it is assumed that one of the "1"s is erroneous. In this case there are two zero crossings separated by two detection instants. In this situation four cases have to be distinguished. These cases differ by whether the positions of the zero crossings is before or after the nearest detection instant. In the table below these situations are presented, together with the corresponding error measures.

TABLE 1

| First zero x | Second zero x | Dl | Dr | Symbol value after correction |
|---|---|---|---|---|
| before | before | >3 | 0 | 01001 |
| before | after | 1 | 2 | if (LeftError < RightError) 10010 else 01001 |
| after | before | 3 | 0 | if (LeftError < RightError) 10010 else 01001 |
| after | after | 1 | >3 | 10010 |

Figure 4:
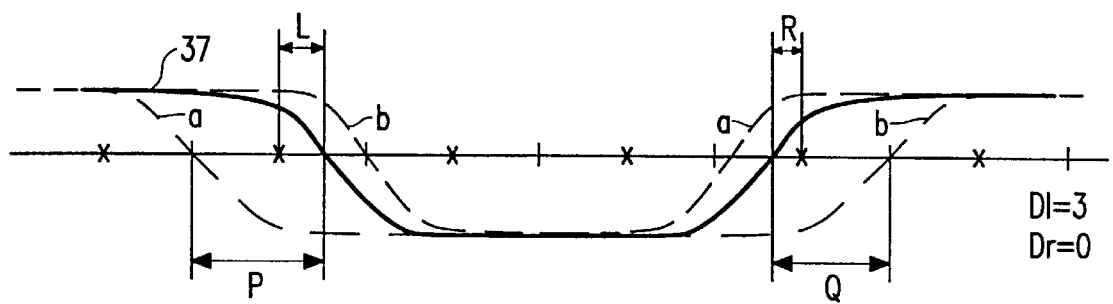
FIG. 4, graphs of actual input signals and the corresponding error signals in case of a d=1 error.
Figure 4:
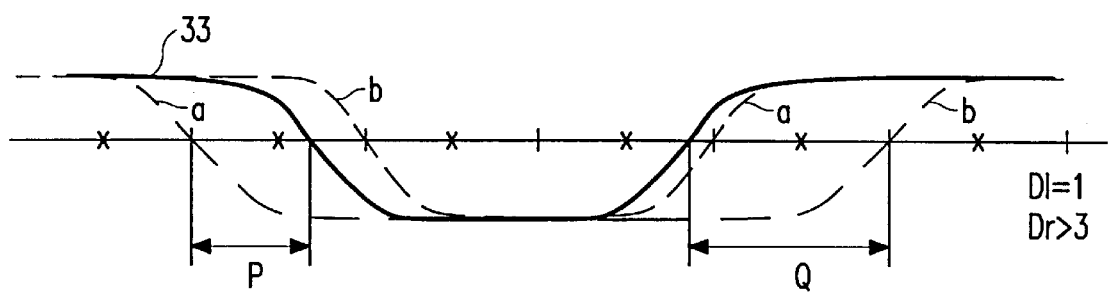
Figure 4:
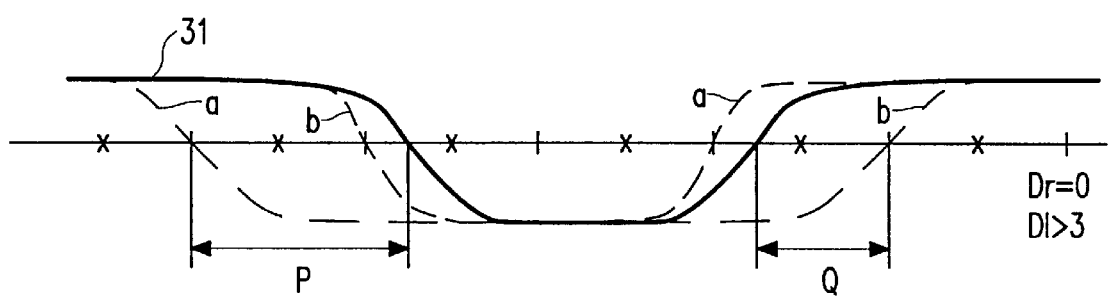
Figure 4:
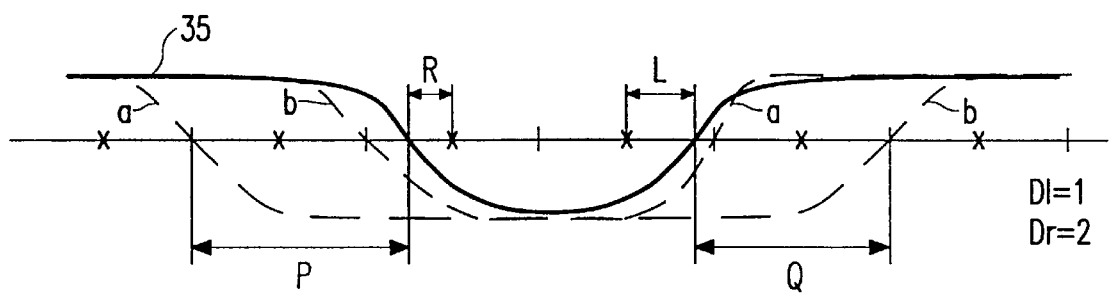

If both zero crossings are before the nearest detection instant, the most likely situation is that the second "1" detected is in error, and consequently this one has to be shifted to the right. This can be seen from graph 31 in FIG. 4, which shows the two possible ideal input signals a and b (dotted lines) and the actual input signal (solid line). From graph 31 can be seen that the distance P between the first zero crossing in the input signal, and the first zero crossing in signal a, is always larger than the distance Q between the second zero crossing in the input signal and the second zero crossing in the signal b. It is likely that, due to disturbing signals, the second zero crossing in the signal b has been shifted to the position of the actual zero crossing in the input signal. Consequently signal b is regarded as the ideal representation of the detected sequence, and the symbol values after corrections are 01001.

Figure 5:
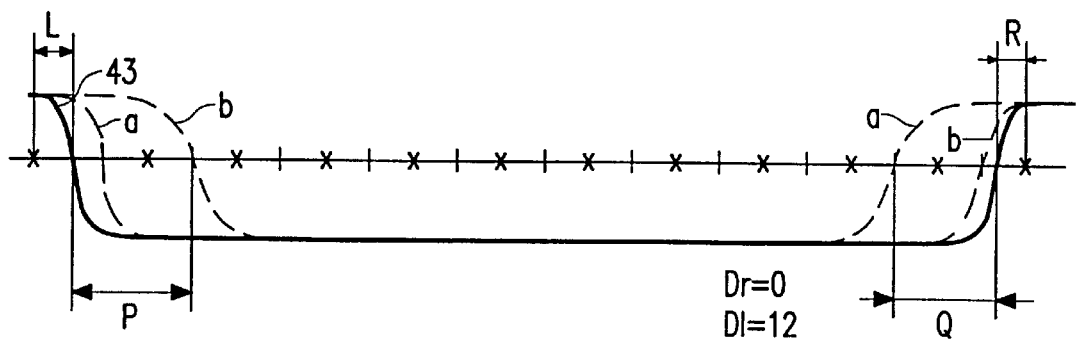
FIG. 5, graphs of actual input signals and the corresponding error signals in case of k=11 error.
Figure 5:
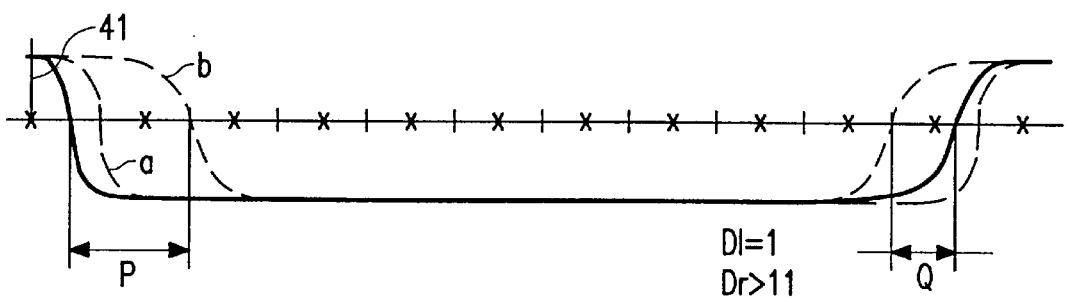
Figure 5:
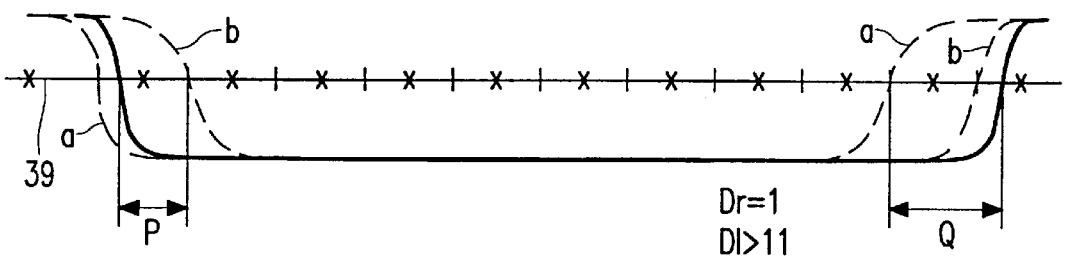
Figure 5:
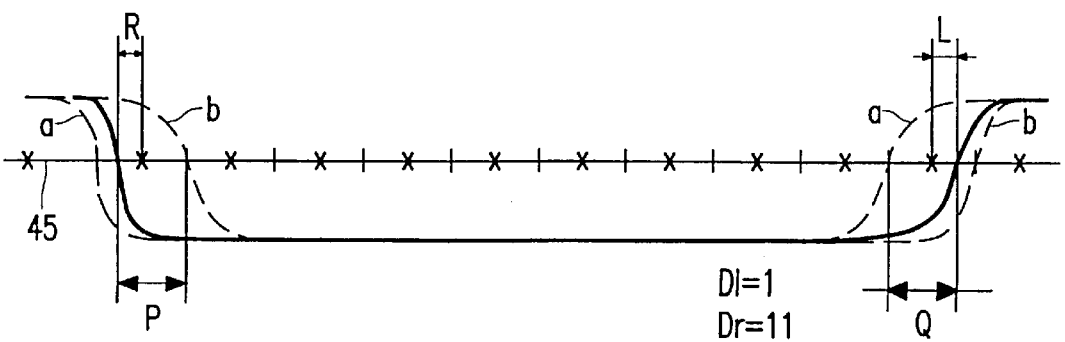

If both zero crossings are after the nearest detection instant, the most likely situation is that the first "1" detected is in error, and consequently this one has to be shifted to the left. This can be seen from graph 33 in FIG. 5, which again shows the two possible ideal input signals a and b (dotted lines) and the actual input signal (solid line). From graph 33 it can be seen that the distance P between the first zero crossing in the input signal, and the first zero crossing in signal a, is always smaller than the distance Q between the second zero crossing in the input signal and the second zero crossing in the signal b. It is likely that, due to disturbing signals, the first zero crossing in the signal a has been shifted to the position of the actual zero crossing in the input signal. Consequently signal a is regarded as the ideal representation of the detected sequence, and the symbol values after correction are 01001.

If the first zero crossing is before the nearest zero crossing and the second zero crossing is after the nearest zero crossing, both sequences of detected symbols are possible. The decision between them is now based on the values of the signals LeftError and RightError. If LeftError is smaller than RightError, the most likely situation is that the first "1" is in error, and consequently this "1" has to be shifted to the left. Otherwise the most likely situation is that the second "1" detected is in error, and consequently this one has to be shifted to the right. This can be seen from graph 35 in FIG. 4. In graph 35 the error signals LeftError is indicated with L, and the error signal RightError is indicated with R. From graph 35 it can be seen that if LeftError (L) is larger than RightError (R), the distance P between the first zero crossing in signal a and the first zero crossing in the actual input signal is larger than the distance Q between the second zero crossing in signal b and the second zero crossing in the actual input signal. In this situation, it is likely that signal b represents the correct sequence of symbols 01001.

If the first zero crossing is after the nearest zero crossing and the second zero crossing is before the nearest zero crossing, both sequences of detected symbols are possible. The decision between them is based on the values of the signals LeftError and RightError. If LeftError is smaller than RightError, the most likely situation is that the first "1" is in error, and consequently this "1" has to be shifted to the left. Otherwise the most likely situation is that the second "1" detected is in error, and consequently this one has to be shifted to the right. This can be seen from graph 37 in FIG. 5. In graph 37 the error signal LeftError is indicated with L, and the error signal RightError is indicated with R. From graph 37 it can be seen that if LeftError (L) is larger than RightError (R), the distance P between the first zero crossing in signal a and the first zero crossing in the actual input signal is larger than the distance Q between the second zero crossing in signal b and the second zero crossing in the actual input signal. In this situation, it is likely that signal b represents the correct sequence of symbols 01001.

If the sequence of bits at the output of the phase detector 34 contains the string "010000000000010" (k=12 error) it is assumed that one of the "1"s has a wrong position. In this case there are two zero crossings separated by 12 detection instants. Again four cases have to be distinguished. These cases differ by whether the positions of the zero crossings is before or after the nearest detection instant. In the table below these situations are presented, together with the corresponding error measures.

TABLE 2

| first zero x | second zero x | Dl | Dr | Detected symbols |
|---|---|---|---|---|
| before | before | >11 | 0 | 010000000000001 |
| before | after | 1 | 11 | if (LeftError < RightError) 100000000000010 else 010000000000001 |
| after | before | 12 | 0 | if (LeftError < RightError) 100000000000010 else 010000000000001 |
| after | after | 1 | >11 | 100000000000010 |

If both zero crossings are before the nearest detection instant, the most likely situation is that the first "1" detected is in error, and consequently this one has to be shifted to the right. This can be seen from graph 39 in which the distance P between the first zero crossing in the actual input signal and the first zero crossing in the signal b is always smaller than the distance Q between the second zero crossing in the actual input signal and the second zero crossing in the signal a. The most likely situation is that the first zero crossing in signal b has been shifted to its (erroneous) actual position. Consequently the first one has to be shifted to the right.

If both zero crossings are after the nearest detection instant, the most likely situation is that the second "1" detected is in error, and consequently this one has to be shifted to the left. This can be seen from graph 41 in which the distance P between the first zero crossing in the actual input signal and the first zero crossing in the signal b is always larger than the distance Q between the second zero crossing in the actual input signal and the second zero crossing in the signal a. The most likely situation is that the second zero crossing in signal a has been shifted to its (erroneous) actual position. Consequently the second one has to be shifted to the left.

If the first zero crossing is after the nearest zero crossing and the second zero crossing is before the nearest zero crossing, both sequences of detected symbols are possible. The decision between them is based on the values of the signals LeftError and RightError. If LeftError is smaller than RightError, the most likely situation is that the second "1" is in error, and consequently this "1" has to be shifted to the left. Otherwise the most likely situation is that the first "1" detected is in error, and consequently this one has to be shifted to the right. In graph 43 of FIG. 5, the error signal LeftError is indicated with L and the error signal RightError is indicated with R. From graph 43 it can be seen that if LeftError (L) is larger than RightError (R), the distance P between the first zero crossing in signal b and the first zero crossing in the actual input signal is smaller than the distance Q between the second zero crossing in signal a and the second zero crossing in the actual input signal. In this situation, it is likely that signal b represents the correct sequence of symbols 01000000000001.

If the first zero crossing is before the nearest zero crossing and the second zero crossing is after the nearest zero crossing, again both sequences of detected symbols are possible. The decision between them is based on the values of the signals LeftError and RightError. If LeftError is smaller than RightError, the most likely situation is that the second "1" is in error, and consequently this "1" has to be shifted to the left. Otherwise the most likely situation is that the first "1" detected is in error, and consequently this one has to be shifted to the right. In graph 45 of FIG. 5, the error signal LeftError is indicated with L and the error signal RightError is indicated with R. From graph 45 it can be seen that if LeftError (L) is larger than RightError (R), the distance P between the first zero crossing in signal b and the first zero crossing in the actual input signal is smaller than the distance Q between the second zero crossing in signal a and the second zero crossing in the actual input signal. In this situation, it is likely that signal b represents the correct sequence of symbols 10000000000010.

In the correction means 40 the sequence of bits received from the phase detector is corrected as described above. The correction is performed by performing an EXOR operation with a correction sequence.

Figure 6:
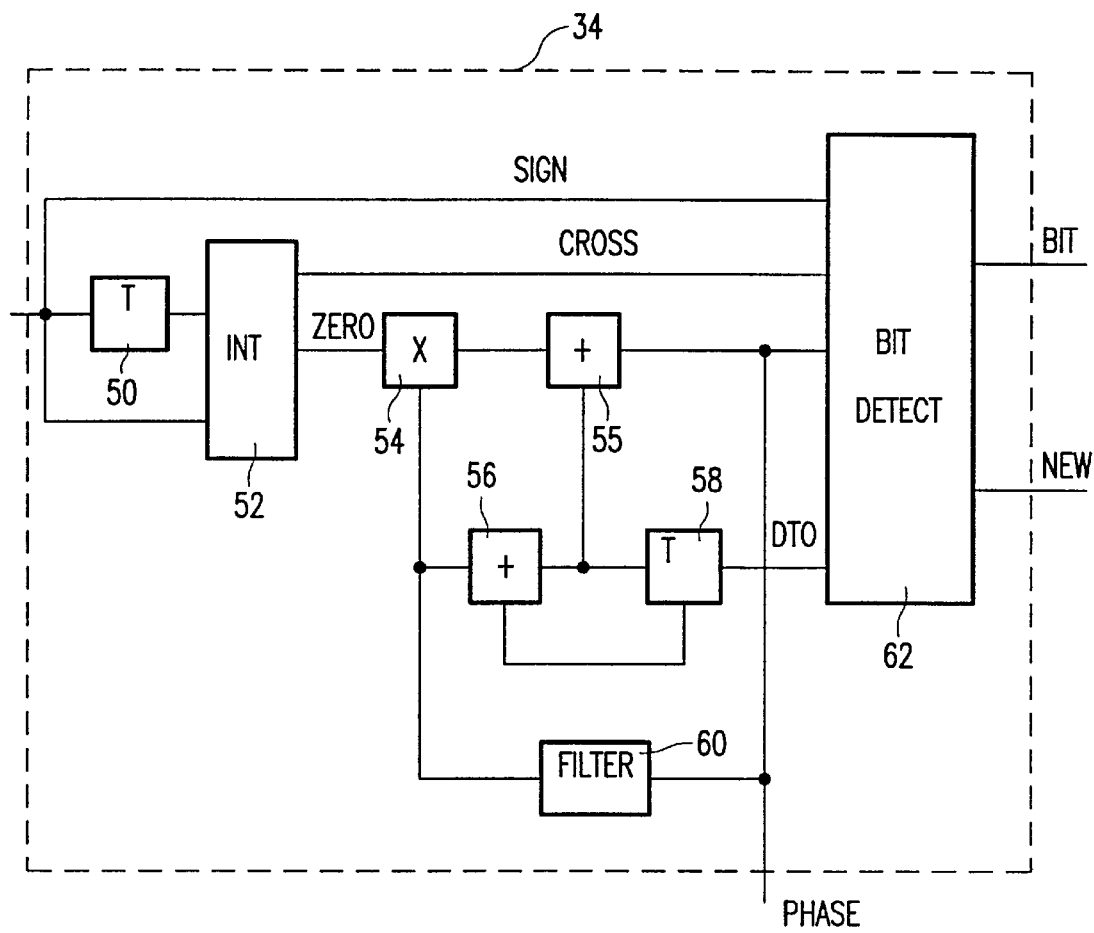
FIG. 6, the implementation of a phase detector 34 to be used in the detector accord to FIG. 3.

In the phase locked loop 34 according to FIG. 6, the input of the phase locked loop is connected to a first input of a delay unit 50, a first input of an interpolator 52, and a first input of a bit detector 62. The output of the delay unit 50 is connected to a second input of the interpolator 52. A first output of the interpolator 52 is connected to a first input of a multiplier 54, and a second output of the interpolator 52, carrying the output signal CROSS, is connected to a second input of the bit detector 62. The output of the multiplier 54 is connected to a first input of an adder 55. The output of the adder 55, carrying the signal PHASE, is connected to a third input of the bit detector 62, to an output of the phase detector 34, and to an input of a filter 60.

The output of the filter 60 is connected to a second input of the multiplier 54 and to a first input of an adder 56. The output of the adder 56 is connected to a second input of the adder 54 and to an input of a delay element 58. The output signal of the delay unit 58, carrying the signal DTO, is connected to a fourth input of the bit detector 62.

The digital phase locked loop 34 uses a digital oscillator comprising the adder 56 and the delay unit 58. The signal at the input of the adder 56 represents the frequency of the digital oscillator. At each sample instant, the phase of the digital oscillator is advanced with a value corresponding to the frequency. The value of the frequency is derived by the filter 60 from a phase error corresponding to the difference of the actual zero crossings and the nominal positions of said zero crossings. The filter 60 comprises a combination of proportional path and an integrating path. The transfer function H(z) of the filter 60 is equal to z/(z−1). The phase detector comprises the combination of delay unit 50 and interpolator 52.

The input signal of the phase locked loop 34 is sampled with a free running clock signal with a frequency of 4/(3T) in which T is the bit period. The interpolator 52 determines whether there is a zero crossing in the input signal by comparing the signs of two subsequent samples of the input signal. If such a zero crossing occurs, the interpolator 52 issues a signal CROSS to the bit detector 62. The interpolator 52 determines a measure ZERO for the position of the zero crossing according to:

$$\text{ZERO} = \frac{S_1}{S_1 + S_2} \quad (1)$$

In (1) $S_1$ is the value of the input sample before the zero crossing, and $S_2$ is the value of the input sample after the zero crossing. The signal ZERO has a value between 0 and 1. The signal ZERO is multiplied by the frequency in order to normalize it. This multiplication is performed by the multiplier 54. Subsequently the output signal of the adder 56 is added to the output signal of the multiplier 54, to obtain a phase error signal PHASE that is a measure for a distance of a zero crossing from its nominal value. The phase error signal PHASE is represented in 2's complement format. This phase error signal is used to derive the control signal for the digital oscillator. The digital controlled oscillator is controlled in such a way hat the phase error is equal to 0 at the average position of the zero crossings of the input signal. The frequency has such a value that in average, the digital oscillator overflows once per bit period. This (virtual) overflow takes place at the decision instant. The overflow can be virtual because not always a sample is available exactly at the decision instant.

The bit detector 62 determines the value of the current bit from the sign of the current sample, the signal CROSS indicating the presence of a zero crossing, the phase error signal PHASE, and the actual output signal DTO of the digital oscillator comprising adder 56 and memory element 58. The bit detector 62 is arranged for determining the sign of the input signal at the (virtual) decision instant. First it has to be established whether there is a decision instant between two samples. This can be determined by checking if between two samples the Most Significant Bit of the signal DTO is changed from "0" to "1". With a sampling rate of 4/(3T), this is always the case, except in the situation where said MSB changes from "1" to "0". Consequently an output signal of the bit detector 62 has only to be blocked if the old MSB value is equal to "1" and the new MSB value is equal to "0". The bit value to be passed to the output is equal to the sign of the input signal if the zero crossing takes place after the (virtual) detection instant, and the bit value to be passed to the output is the inverted value of the sign of the input signal if the zero crossing takes place before the (virtual) detection instant. This can easily be determined from the phase error signal PHASE which indicates the position of the zero crossing. Generally, the zero crossing takes place before the detection instant if the signal PHASE (in 2's complement) is negative, and the zero crossing takes place after the detection instant if the signal PHASE is positive. Care has to be taken in cases where an (virtual) overflow of the digital oscillator occurs. In such situations the decision depends on the current and previous value of the MSB of the digital oscillator (DTO).

If the previous value of the MSB of the DTO is "0" and the current value of the MSB of the DTO is "1", no overload takes place, and consequently the position of the zero crossing can be derived from the signal PHASE alone, as explained above.

If the previous value of the MSB of the DTO is "1" and the current value of the MSB of the DTO is "1", overload takes place. In this situation, the zero crossing takes place before the detection instant if the signal PHASE is smaller than zero or if the signal PHASE is larger than the previous DTO value.

If the previous value of the MSB of the DTO is "1" and the current value of the MSB of the DTO is "0", overload takes place. In this situation, no detection instant is present, so the signal phase does not have to be considered at all.

If the previous value of the MSB of the DTO is "0" and the current value of the MSB of the DTO is "0", again overload takes place. In this situation, the zero crossing takes place before the detection instant if the signal PHASE is smaller than zero and the signal PHASE is larger than the previous DTO value.

In an alternative embodiment of the bit detector 62, the representation of the signal PHASE comprises an additional bit which indicates that an overflow of the DTO has occurred between the sampling instants. The additional bit in the signal PHASE has a value "0" if the zero crossing is before the overflow instant of the DTO, and has a value "1" if the zero crossing is after the overflow instant. This bit is obtained by increasing the size of the memory unit 58 by one bit, and using the new MSB as overflow bit. A signal INV that indicates that the zero crossing is before the detection instant (and consequently indicates that the bit value has to be inverted) can be derived according to:

$$INV = (MSB_{DTO}\ \&\ EB_{PHASE}\ \&\ MSB_{PHASE}) + (\overline{MSB}_{DTO}\ \&\ (EB_{PHASE} \oplus MSB_{PHASE})) \quad (2)$$

In (2) $MSB_{DTO}$ is the value of the new MSB of the DTO, $EB_{PHASE}$ is the additional bit of the signal PHASE, and $MSB_{PHASE}$ is the MSB of the signal PHASE.

The values of the output bits of the PLL 34, are presented in differential format: a "1" indicates a value change, and a "0" indicates a constant value of the received bits.

In the flow graph according to FIG. 7, the blocks have the meaning according to the table below:

| No. | Inscript | Meaning |
|---|---|---|
| 70 | BEGIN | The program is started and all variables are initialized |
| 71 | NEXT SAMPLE | A next sample of the input signal is taken. |
| 72 | ZERO CROSSING? | It is checked whether a zero crossing is present. |
| 73 | NEW? | It is checked if a decision instant is present. |
| 74 | PHASE > 0? | It is checked if the phase error signal is larger than zero |
| 75 | Dr = Dr + 1; Dl = Dl + 1 | The relative positions of the right and left zero crossing are incremented. |
| 76 | CALC. RightError | The error signal RightError is calculated from the phase error |
| 78 | CALC. LeftError | The error signal LeftError is calculated from the phase error |
| 80 | NEW? | It is checked if a decision instant is present between the previous sample and the current sample |
| 82 | NEW? | It is checked if a decision instant is present. |
| 84 | Dr = 0 | The relative position of the right zero crossing is set to 0 |
| 86 | Dr = 1 | The relative position of the right zero crossing is set to 1 |
| 88 | Dl = 0 | The relative position of the left zero crossing is set to 0 |
| 90 | Dl = 1 | The relative position of the left zero crossing is set to 1 |
| 92 | Dl = Dl + 1 | The relative position of the left zero crossing is incremented |
| 94 | Dr = Dr + 1 | The relative position of the right zero crossing is incremented |

Figure 7:
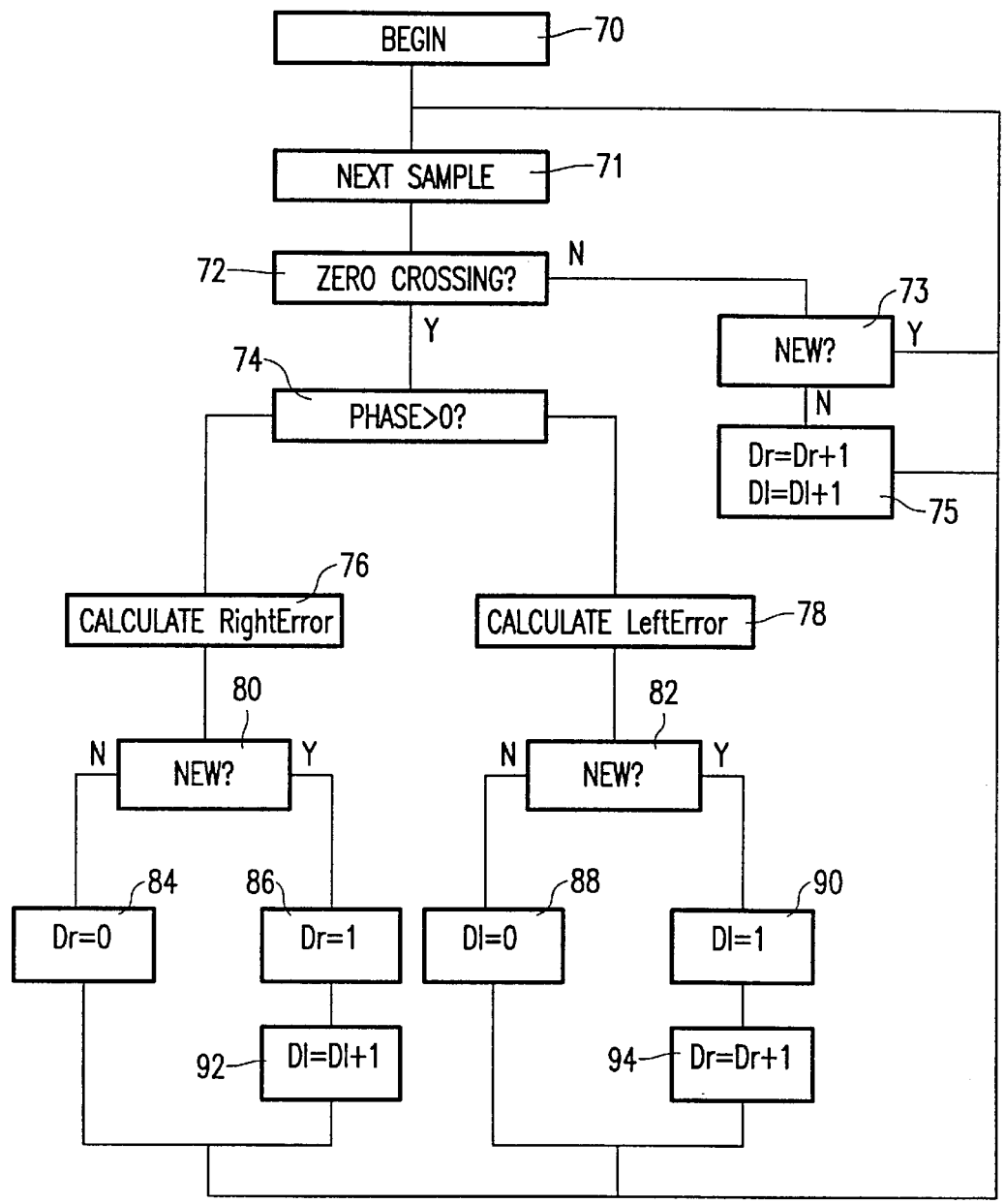
FIG. 7, a flow diagram of a program for a programmable processor to implement the function of the error signal calculator 44 in FIG. 3.

The program according to FIG. 7 is arranged for implementing the function of the error signal calculator 44 in FIG. 3.

An initialization of the used variables takes place in instruction 70. The program uses the signals CROSS, PHASE and DTO present in the phase locked loop 34. In instruction 71 is waited for a next sample to be taken by the A/D converter 32 in FIG. 3. In instruction 72 it is checked if there is a zero crossing present between the present sample and previous sample of the input signal. This is done by checking the signal CROSS in the PLL 34.

If no zero crossing is present, it is checked whether there is a decision instant present between the present sample and the current sample. This is the case if the MSB of the signal DTO is equal to "1". If no decision instant is present between the samples, the program continues at instruction 71. If a decision instant is present, the relative positions of the left and right zero crossings are incremented in instruction 75, and subsequently the program is continued at instruction 71.

If the execution of instruction 72 reveals that a zero crossing is present between the present and the previous sample, in instruction 74 it is checked whether the signal PHASE is larger than zero. If this is the case, in instruction 76 the signal RightError is calculated from the signal PHASE according to:

$$RightError = MaxPhase - PHASE \quad (3)$$

In (3) MaxPhase is the maximum value the signal PHASE can assume.

In instruction 80 it is checked whether there is a decision instant present between the present sample of the input signal and the previous sample. If such a detection instant is not present, in instruction 84 the position Dr of the most recent right zero crossing is set to 0, and the program is continued at instruction 71. If there is a detection instant between the present sample of the input signal and the previous sample, in instruction 86 the position Dr is set to 1, and in instruction 92 the value of the position Dl of the most recent left zero crossing is incremented. Subsequently the program is continued at instruction 71.

If in instruction 74 it is established that PHASE is not larger than zero, in instruction 78 the value of the error signal LeftError is calculated according to:

$$LeftError = MaxPhase + PHASE \quad (4)$$

In instruction 82 it is checked whether there is a decision instant present between the present sample of the input signal and the previous sample. If such a detection instant is not present, in instruction 88 the position Dl of the most recent right zero crossing is set to 0, and the program is continued at instruction 71. If there is a detection instant between the present sample of the input signal and the previous sample, in instruction 90 the position Dl is set to 1, and in instruction 92 the value of the position Dr of the most recent left zero crossing is incremented. Subsequently the program is continued at instruction 71.

Figure 8:
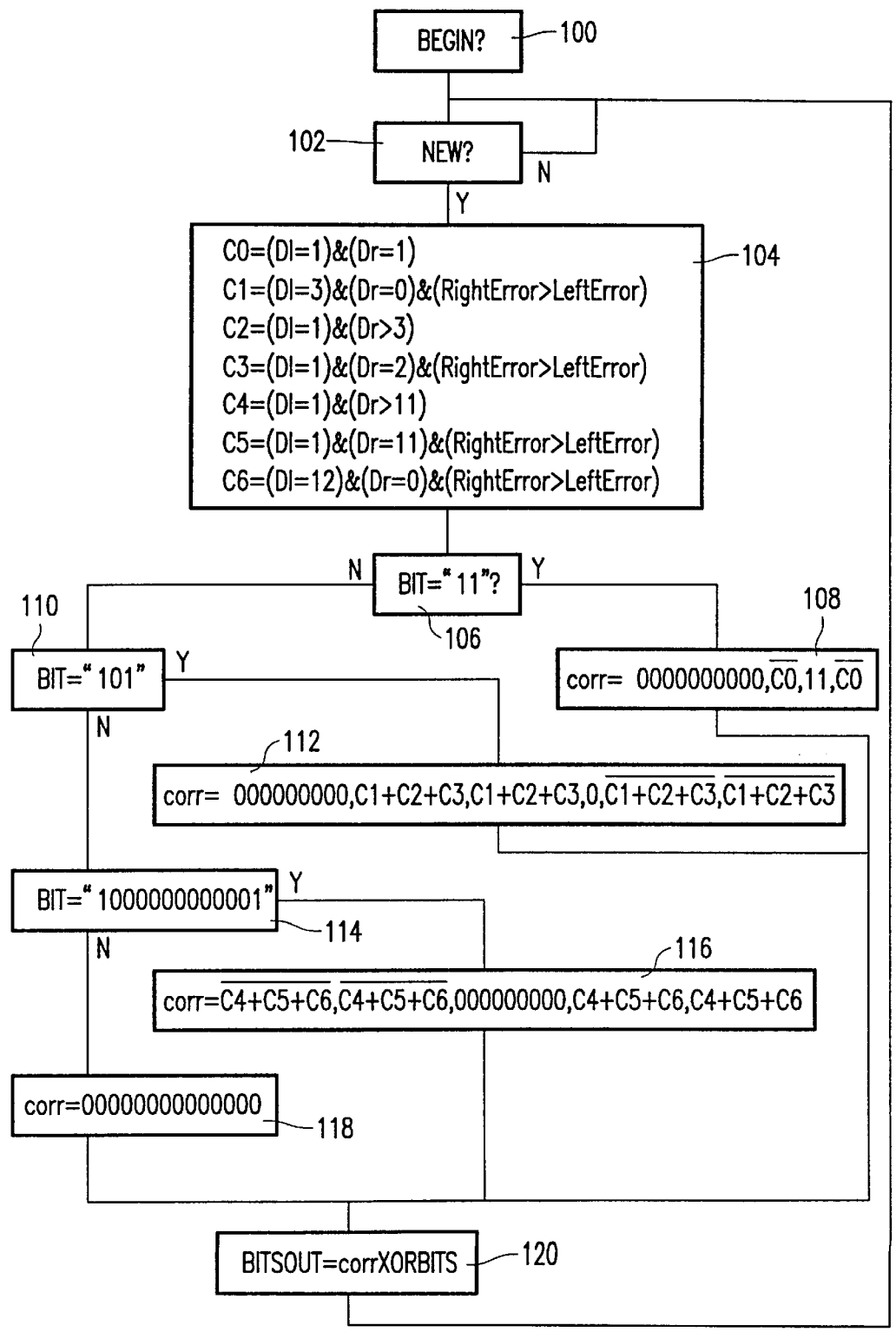
FIG. 8, a flow diagram of a program for a programmable processor to implement the function of the check unit 40, and the correction unit 42 in FIG. 3.

FIG. 8 shows a flow diagram of a program for a programmable processor for implementing the function of the error detector 38 and the error corrector 40. The numbered instructions according to FIG. 8 have the meaning according to the table below.

| No. | Inscript | Meaning |
|---|---|---|
| 100 | BEGIN | The program is started and the variables are initialized. |
| 102 | NEW ? | It is checked whether a new bit is present at the output of the PLL 34. |
| 104 | C0 = (D1 = 1) & (Dr = 1)<br>C1 = (D1 = 3) & (Dr = 0) & (RightError > LeftError)<br>C2 = (D1 = 1) & (Dr > 3)<br>C3 = (D1 = 1) & (Dr = 2) & (RightError > LeftError)<br>C4 = (D1 = 1) & (Dr > 11)<br>C5 = (D1 = 1) & (Dr = 11) & (RightError > LeftError)<br>C6 = (D1 = 12) & (Dr = 0) & (RightError > LeftError) | A number of correction flags is determined. |
| 106 | BIT = "11" ? | It is checked whether there occurs a d = 0 error. |
| 108 | corr = 000000000, $\overline{C0}$, 11, $\overline{C0}$ | The correction sequence for a d = 0 error is determined. |
| 110 | BIT = "101" ? | It is checked whether there occurs a d = 1 error. |
| 112 | corr = $\dfrac{00000000, C1 + C2 + C3, C1 + C2 + C3,}{0, \overline{C1 + C2 + C3}, \overline{C1 + C2 + C3}}$ | The correction sequence for a d = 1 error is determined. |
| 114 | BIT = "1000000000001" ? | It is checked whether there occurs a k = 12 error. |
| 116 | corr = $\dfrac{\overline{C4 + C5 + C6}, \overline{C4 + C5 + C6}, 000000000,}{C4 + C5 + C6, C4 + C5 + C6}$ | The correction sequence for a k = 12 error is determined. |
| 118 | corr = "000000000000000000" | The correction sequence is set to all zeros in case of no errors. |
| 120 | BITSOUT = corr XOR BITS | The corrected sequence BITSOUT is determined. |

In the flow graph according to FIG. 8 in instruction 100 the program is started. In instruction 102 the program waits for the next new bit from the PLL 34. The presence of such a new bit is signaled by the signal NEW at the output of the PLL 34. The signal new corresponds to the MSB of the signal DTO in the PLL 34. In instruction 104 correction flags C0 . . . C6 for the different types of errors are calculated. The error flag C0 corresponds to a d=1 error. The flag is set if in case of a d=1 error the bit sequence "0110" has to be changed into "0000". The flags C1, C2 and C3 correspond to a d=2 error. These flags indicate that a bit sequence "01010" has to be changed into "10010". They are set under the conditions already explained with reference to Table 1. The flags C4, C5 and C6 correspond to a k=12 error. These flags indicate that a bit sequence "1000000000001" has to be changed into "1000000000010". They are set under the conditions already explained with reference to Table 2.

In instruction 106 it is checked whether there is a d=1 error present in the bit sequence from the PLL 34. This check is performed by looking for a bit sequence "11". If such a d=1 error is present, in instruction 108 a correction mask is determined using the value of the flag C0. Subsequently the program continues at instruction 120.

If no d=1 error is present, in instruction 110 it is checked whether there is a d=2 error present in the bit sequence from the PLL 34. This check is performed by looking for a bit sequence "101". If a d=2 error is present, in instruction 112 a correction mask is determined using the values of the flags C1, C2 and C3. Subsequently the program continues at instruction 120.

If no d=2 error is present, in instruction 114 it is checked whether there is a k=12 error present in the bit sequence from the PLL 34. This check is performed by looking for a bit sequence "1000000000001". If a k=12 error is present, in instruction 116 a correction mask is determined using the values of the flags C4, C5 and C6. Subsequently the program continues at instruction 120.

If no k=12 error is present, the correction mask is set in instruction 118 to a sequence of zeros, indicating that no correction is needed. The program is continued at instruction 120.

In instruction 120 the correction mask determined in the previous part of the program is EXOR-ed with the bit sequence from the PLL 34 in order to obtain the corrected bit sequence. Subsequently the program continues at instruction 102 for processing the next bit from the PLL 34.

What is claimed is:

1. Method for reproducing digital symbols carried by an input signal, the input signal comprising at least two bits, crossing a zero level at least twice, and continuing in time for a plurality of detection instants, the method comprising the steps of:

a) determining a first zero crossing error that indicates an error about a first of the plurality of detection instants for the first zero crossing of the input signal;

b) determining a second zero crossing error that indicates an error about a second of the plurality of detection instants for the second zero crossing of the input signal;

c) determining, relative to a current detection instant that is nearest the second zero crossing but is later in time than the second zero crossing, a first relative position error, the first relative position error relating the current detection instant to a detection instant that is later in time but closest to a zero crossing and that is closest of the plurality of detection instants to the current detection instant;

d) determining, relative to the current detection instant, a second relative position error, the second relative position error relating the current detection instant to a detection instant that is earlier in time but closest to a zero crossing and that is closest of the plurality of detection instants to the current detection instant;

e) determining, from the first and second zero crossing errors and the first and second relative position errors, if a bit or bits of the at least two bits are erroneous; and f) if a bit or bits of the at least two bits are erroneous, correcting the bit or bits of the at least two bits that are erroneous.

2. The method of claim 1:

wherein the step of determining a first relative error position comprises the steps of:

1. determining, from an early detection instant that is earlier than the earliest of the first and second zero crossings and to the current detection instant, if there is a detection instant that is closest to one of the first or second zero crossings and later in time than the first or second zero crossing;

2. if there is a such a detection instant, setting the first relative position error equal to the number of detection instants between this detection instant and the current detection instant, including this detection instant but not including the current detection instant, wherein if the current detection instant is this detection instant the first relative position error is set to zero; and 3. if there is not such a detection instant, setting the first relative position error greater than the number of detection instants between the early detection instant and the current detection instant, including the early detection instant but not including the current detection instant; and wherein the step of determining a second relative error position comprises the steps of:

1. determining, from the early detection instant and to the current detection instant, if there is a detection instant that is closest to one of the first or second zero crossings and earlier in time than the first or second zero crossing;

2. if there is a such a detection instant, setting the second relative position error equal to the number of detection instants between this detection instant and the current detection instant, including this detection instant but not including the current detection instant, wherein if the current detection instant is this detection instant the second relative position error is set to zero; and 3. if there is not such a detection instant, setting the second relative position error greater than the number of detection instants between the early detection instant and the current detection instant, including the early detection instant but not including the current detection instant.

3. The method of claim 1 wherein the first zero crossing error indicates whether the first zero crossing occurred before or after the first detection instant and wherein the second zero crossing error indicates whether the second zero crossing occurred before or after the second detection instant.

4. The method of claim 3 wherein the step of determining a first zero crossing error further comprises the step of determining a first distance from the first zero crossing to the first detection instant, wherein the step of determining a second zero crossing error further comprises the step of determining a second distance from the second zero crossing to the second detection instant, and wherein the step of determining, from the first and second zero crossing errors and the first and second relative position errors, a bit or bits of the at least two bits that are erroneous comprises the step of determining, from the first and second zero crossing errors, the first and second relative position errors, and the first and second distances, a bit or bits of the at least two bits that are erroneous.

5. The method of claim 1 wherein the digital symbols have a minimum and maximum runlength, and the step of determining, from the first and second zero crossing errors and the first and second relative position errors, if a bit or bits of the at least two bits are erroneous further comprises the steps of:

1. determining that an error occurred by comparing a runlength of the at least two bits with the minimum and maximum runlengths; and 2. determining which of the bit or bits of the at least two bits are erroneous by using the first and second zero crossing errors and the first and second relative position errors.

6. The method of claim 5:

wherein the step of determining a first relative error position comprises the steps of:

1. determining, from an early detection instant that is earlier than the earliest of the first and second zero crossings and to the current detection instant, if there is a detection instant that is closest to one of the first or second zero crossings and later in time than the first or second zero crossing;

2. if there is a such a detection instant, setting the first relative position error equal to the number of detection instants between this detection instant and the current detection instant, including this detection instant but not including the current detection instant, wherein if the current detection instant is this detection instant the first relative position error is set to zero; and 3. if there is not such a detection instant, setting the first relative position error greater than the number of detection instants between the early detection instant and the current detection instant, including the early detection instant but not including the current detection instant; and wherein the step of determining a second relative error position comprises the steps of:

1. determining, from the early detection instant and to the current detection instant, if there is a detection instant that is closest to one of the first or second zero crossings and earlier in time than the first or second zero crossing;

2. if there is a such a detection instant, setting the second relative position error equal to the number of detection instants between this detection instant and the current detection instant, including this detection instant but not including the current detection instant, wherein if the current detection instant is this detection instant the second relative position error is set to zero; and 3. if there is not such a detection instant, setting the second relative position error greater than the number of detection instants between the early detection instant and the current detection instant, including the early detection instant but not including the current detection instant.

7. The method of claim 6 wherein the first zero crossing error indicates whether the first zero crossing occurred before or after the first detection instant and wherein the second zero crossing error indicates whether the second zero crossing occurred before or after the second detection instant.

8. The method of claim 7 wherein the at least two bits are two adjacent bits that have the same value and a runlength of one, wherein the minimum runlength is three, and wherein the step of if a bit or bits of the at least two bits are erroneous, correcting the bit or bits of the at least two bits that are erroneous comprises the steps of:

1. if both the first and second relative position errors are zero, inverting the two adjacent bits; and 2. if at least one of the first and second relative position errors is not zero, inserting two bits between the two adjacent bits, each of the inserted bits being opposite in value to the two adjacent bits such that the runlength of the resultant four bits is three.

9. The method of claim 7 wherein the first zero crossing occurs before the second zero crossing, wherein the step of determining a first zero crossing error further comprises the step of determining a first distance from the first zero crossing to the first detection instant, wherein the step of determining a second zero crossing error further comprises the step of determining a second distance from the second zero crossing to the second detection instant, and wherein the step of determining which of the bit or bits of the at least two bits are erroneous by using the first and second zero crossing errors and the first and second relative position errors further comprises the step of determining which of the bit or bits of the at least two bits are erroneous by using the first and second zero crossing errors, the first and second relative position errors, and the first and second distances.

10. The method of claim 9 wherein the at least two bits are five adjacent bits that have a runlength of two, the lower number bits being earlier in time than the higher numbered bits, the second and fourth bits causing the runlength of two, wherein the minimum runlength is three, and wherein:

if both the first and second zero crossings are before their respective detection instants, the first relative position error is greater than three, and the second relative position error is zero, then the step of determining which of the bit or bits of the at least two bits are erroneous by using the first and second zero crossing errors, the first and second relative position errors, and the first and second distances comprises determining that the fourth and fifth bits are in error, and wherein the step of if a bit or bits of the at least two bits are erroneous, correcting the bit or bits of the at least two bits that are erroneous comprises the step of inverting the erroneous bits;

if the first zero crossing is before its closest detection instant but the second zero crossing is after its closest detection instant, the first relative position error is one, and the second relative position error is two, then the step of determining which of the bit or bits of the at least two bits are erroneous by using the first and second zero crossing errors, the first and second relative position errors, and the first and second distances comprises determining that the first and second bits are in error if the second distance is greater than the first distance else determining that the fourth and fifth bits are in error, and wherein the step of if a bit or bits of the at least two bits are erroneous, correcting the bit or bits of the at least two bits that are erroneous comprises the step of inverting the erroneous bits;

if the first zero crossing is after its closest detection instant but the second zero crossing is before its closest detection instant, the first relative position error is three, and the second relative position error is zero, then the step of determining which of the bit or bits of the at least two bits are erroneous by using the first and second zero crossing errors, the first and second relative position errors, and the first and second distances comprises determining that the first and second bits in error if the first distance is greater than the second distance else determining that the fourth and fifth bits are in error, and wherein the step of if a bit or bits of the at least two bits are erroneous, correcting the bit or bits of the at least two bits that are erroneous comprises the step of inverting the erroneous bits; and if both the first and second zero crossings are after their respective detection instants, the first relative position error is one, and the second relative position error is greater than three, then the step of determining which of the bit or bits of the at least two bits are erroneous by using the first and second zero crossing errors, the first and second relative position errors, and the first and second distances comprises determining that the first and second bits are in error and wherein the step of if a bit or bits of the at least two bits are erroneous, correcting the bit or bits of the at least two bits that are erroneous comprises the step of inverting the erroneous bits.

11. A device for reproducing digital symbols carried by an input signal, the input signal comprising at least two bits, crossing a zero level at least twice, and continuing in time for a plurality of detection instants, the device comprising:

a) means for determining a first zero crossing error that indicates an error about a first of the plurality of detection instants for the first zero crossing of the input signal;

b) means for determining a second zero crossing error that indicates an error about a second of the plurality of detection instants for the second zero crossing of the input signal;

c) means for determining, relative to a current detection instant that is nearest the second zero crossing but is later in time than the second zero crossing, a first relative position error, the first relative position error relating the current detection instant to a detection instant that is later in time but closest to a zero crossing and that is closest of the plurality of detection instants to the current detection instant;

d) means for determining, relative to the current detection instant, a second relative position error, the second relative position error relating the current detection instant to a detection instant that is earlier in time but closest to a zero crossing and that is closest of the plurality of detection instants to the current detection instant;

e) means for determining, from the first and second zero crossing errors and the first and second relative position errors, if a bit or bits of the at least two bits are erroneous; and f) means for correcting the bit or bits of the at least two bits that are erroneous.

12. The device of claim 11:

wherein the means for determining a first relative error position:

determines, from an early detection instant that is earlier than the earliest of the first and second zero crossings and to the current detection instant, if there is a detection instant that is closest to one of the first or second zero crossings and later in time than the first or second zero crossing;

if there is a such a detection instant, sets the first relative position error equal to the number of detection instants between this detection instant and the current detection instant, including this detection instant but not including the current detection instant, wherein if the current detection instant is this detection instant the means for determining a first relative error position sets the first relative position error to zero; and if there is not such a detection instant, sets the first relative position error greater than the number of detection instants between the early detection instant and the current detection instant, including the early detection instant but not including the current detection instant; and wherein the means for determining a second relative error position:

determines, from the early detection instant and to the current detection instant, if there is a detection instant that is closest to one of the first or second zero crossings and earlier in time than the first or second zero crossing;

if there is a such a detection instant, sets the second relative position error equal to the number of detection instants between this detection instant and the current detection instant, including this detection instant but not including the current detection instant, wherein if the current detection instant is this detection instant the means for determining a second relative error position sets the second relative position error to zero; and if there is not such a detection instant, sets the second relative position error greater than the number of detection instants between the early detection instant and the current detection instant, including the early detection instant but not including the current detection instant.

13. The device of claim 11 wherein the device is part of a receiver, the receiver receiving the digital symbols from a transmission channel and coupling them to the device.

14. The device of claim 11 wherein the device is part of a reproduction system, the reproduction system reproducing symbols stored on a medium and also comprising read out means for deriving the input signal representing the digital symbols stored on the medium, the read out means coupling the input signal to the device.

15. The device of claim 11 wherein the means for correcting the bit or bits of the at least two bits that are erroneous inverts the bit or bits by performing an exclusive or of the bit or bits with a correction sequence.

16. The device of claim 11 wherein the means for determining the first and second zero crossing errors comprises a phase locked loop and wherein the means for determining the first and second relative position errors, the means for determining if a bit or bits of the at least two bits are erroneous, and the means for correcting the bit or bits of the at least two bits that are erroneous comprise a programmable processor.

17. The device of claim 11 wherein the first zero crossing error indicates whether the first zero crossing occurred before or after the first detection instant and wherein the second zero crossing error indicates whether the second zero crossing occurred before or after the second detection instant.

18. The device of claim 17 wherein the means for determining a first zero crossing error further determines a first distance from the first zero crossing to the first detection instant, wherein the means for determining a second zero crossing error further determines a second distance from the second zero crossing to the second detection instant, and wherein the means for determining a bit or bits of the at least two bits that are erroneous further uses the first and second distances to determine the bit or bits of the at least two bits that are erroneous.

19. The device of claim 18 further comprising a means for storing the first and second distances, the first and second relative position errors, and first and second zero crossing errors.

20. The device of claim 19 wherein the receiver is part of a transmission system, the transmission system also comprising a transmitter that transmits the digital symbols via the transmission channel to the receiver.

21. The device of claim 11 wherein the digital symbols have a minimum and maximum runlength, and the means for determining if a bit or bits of the at least two bits are erroneous:

determines that an error occurred by comparing a runlength of the at least two bits with the minimum and maximum runlengths; and determines which of the bit or bits of the at least two bits are erroneous by using the first and second zero crossing errors and the first and second relative position errors.

22. The device of claims 21:

wherein the means for determining a first relative error position:

determines, from an early detection instant that is earlier than the earliest of the first and second zero crossings and to the current detection instant, if there is a detection instant that is closest to one of the first or second zero crossings and later in time than the first or second zero crossing;

if there is a such a detection instant, sets the first relative position error equal to the number of detection instants between this detection instant and the current detection instant, including this detection instant but not including the current detection instant, wherein if the current detection instant is this detection instant means for determining a first relative error position sets the first relative position error to zero; and if there is not such a detection instant, setting the first relative position error greater than the number of detection instants between the early detection instant and the current detection instant, including the early detection instant but not including the current detection instant; and wherein the means for determining a second relative error position:

determines, from the early detection instant and to the current detection instant, if there is a detection instant that is closest to one of the first or second zero crossings and earlier in time than the first or second zero crossing;

if there is a such a detection instant, sets the second relative position error equal to the number of detection instants between this detection instant and the current detection instant, including this detection instant but not including the current detection instant, wherein if the current detection instant is this detection instant the means for determining a second relative error position sets the second relative position error to zero; and if there is not such a detection instant, sets the second relative position error greater than the number of detection instants between the early detection instant and the current detection instant, including the early detection instant but not including the current detection instant.

23. The device of claim 22 wherein the first zero crossing error indicates whether the first zero crossing occurred before or after the first detection instant and wherein the second zero crossing error indicates whether the second zero crossing occurred before or after the second detection instant.

24. The device of claim 23 wherein the at least two bits are two adjacent bits that have the same value and a runlength of one, wherein the minimum runlength is three, and wherein the means for correcting the bit or bits of the at least to bits that are erroneous:

if both the first and second relative position errors are zero, inverts the two adjacent bits; and if at least one of the first and second relative position errors is not zero, inserts two bits between the two adjacent bits, each of the inserted bits being opposite in value to the two adjacent bits such that the runlength of the resultant four bits is three.

25. The device of claim 23 wherein the first zero crossing occurs before the second zero crossing, wherein the means for determining a first zero crossing error further determines a first distance from the first zero crossing to the first detection instant, wherein the means for determining a second zero crossing error further determines a second distance from the second zero crossing to the second detection instant, and wherein the means for determining which of the bit or bits of the at least two bits are erroneous further uses the first and second distances to determine which of the bit or bits of the at least two bits are erroneous.

26. The device of claim 25 wherein the at least two bits are five adjacent bits that have a runlength of two, the lower number bits being earlier in time than the higher numbered bits, the second and fourth bits causing the runlength of two, wherein the minimum runlength is three, and wherein:

if both the first and second zero crossings are before their respective detection instants, the first relative position error is greater than three, and the second relative position error is zero, then the means for determining if a bit or bits of the at least two bits are erroneous determines that the fourth and fifth bits are in error, and wherein the means for correcting the bit or bits of the at least two bits that are erroneous inverts the erroneous bits;

if the first zero crossing is before its closest detection instant but the second zero crossing is after its closest detection instant, the first relative position error is one, and the second relative position error is two, then the means for determining if a bit or bits of the at least two bits are erroneous determines that the first and second bits are in error if the second distance is greater than the first distance else determines that the fourth and fifth bits are in error, and wherein the means for correcting the bit or bits of the at least two bits that are erroneous inverts the erroneous bits;

if the first zero crossing is after its closest detection instant but the second zero crossing is before its closest detection instant, the first relative position error is three, and the second relative position error is zero, then the means for determining if a bit or bits of the at least two bits are erroneous determines that the first and second bits in error if the first distance is greater than the second distance else determines that the fourth and fifth bits are in error, and wherein the means for correcting the bit or bits of the at least two bits that are erroneous inverts the erroneous bits; and if both the first and second zero crossings are after their respective detection instants, the first relative position error is one, and the second relative position error is greater than three, then the means for determining if a bit or bits of the at least two bits are erroneous determines that the first and second bits are in error and wherein the means for correcting the bit or bits of the at least two bits that are erroneous inverts the erroneous bits.

* * * * *